United States Patent
Chang

(10) Patent No.: US 9,232,466 B2
(45) Date of Patent: Jan. 5, 2016

(54) COMMUNICATIONS APPARATUS AND METHOD FOR REDUCING POWER CONSUMPTION OF A COMMUNICATIONS APPARATUS IN AN AP MODE

(71) Applicant: MediaTek Inc, Hsin-Chu (TW)

(72) Inventor: Chia-Ming Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 311 days.

(21) Appl. No.: 13/686,482

(22) Filed: Nov. 27, 2012

(65) Prior Publication Data

US 2014/0146723 A1    May 29, 2014

(51) Int. Cl.
*H04W 52/02* (2009.01)

(52) U.S. Cl.
CPC ...... *H04W 52/0206* (2013.01); *H04W 52/0241* (2013.01); *Y02B 60/50* (2013.01)

(58) Field of Classification Search
CPC ............... H04W 52/00–52/0296; Y02B 60/50
USPC ................................ 370/311; 455/127.5, 574
See application file for complete search history.

(56) References Cited

U.S. PATENT DOCUMENTS

| | | | |
|---|---|---|---|
| 2004/0218620 A1* | 11/2004 | Palm et al. | 370/445 |
| 2006/0176896 A1 | 8/2006 | Callaway, Jr. et al. | |
| 2009/0017807 A1* | 1/2009 | Kwon et al. | 455/416 |
| 2009/0259974 A1* | 10/2009 | Lin | 715/840 |
| 2010/0284316 A1 | 11/2010 | Sampathkumar | |
| 2010/0309831 A1* | 12/2010 | Yeh et al. | 370/311 |
| 2012/0026992 A1* | 2/2012 | Navda et al. | 370/338 |
| 2012/0099566 A1* | 4/2012 | Laine et al. | 370/338 |
| 2012/0269107 A1* | 10/2012 | Palm et al. | 370/311 |
| 2013/0040576 A1* | 2/2013 | Yoon | 455/41.2 |
| 2013/0124894 A1* | 5/2013 | Cho | 713/323 |
| 2014/0126391 A1* | 5/2014 | Liu et al. | 370/252 |

FOREIGN PATENT DOCUMENTS

| | | |
|---|---|---|
| WO | 2010006142 A1 | 1/2010 |
| WO | 2012136168 A2 | 10/2012 |

* cited by examiner

*Primary Examiner* — Paul H Masur
*Assistant Examiner* — Kabir Jahangir
(74) *Attorney, Agent, or Firm* — McClure, Qualey & Rodack, LLP

(57) ABSTRACT

A communications apparatus having an RF signal processing device, a baseband signal processing device and an access control module is provided. The RF signal processing device transmits and receives an RF signal and processes the RF signal in accordance with a predetermined protocol to generate a first signal. The baseband signal processing device is coupled to the RF signal processing device and processes the first signal. The access control module controls operations of the communications apparatus in at least a station mode and an AP mode. The access control module issues a first indication signal and a second indication signal under the AP mode so that the RF signal processing device and the baseband signal processing device are switched between a first power level and a second power level in the AP mode.

12 Claims, 5 Drawing Sheets

COMMUNICATIONS APPARATUS AND METHOD FOR REDUCING POWER CONSUMPTION OF A COMMUNICATIONS APPARATUS IN AN AP MODE

BACKGROUND OF THE INVENTION

1. Field of the Invention

The invention relates to a communications apparatus and a method for reducing power consumption of a communications apparatus, and more particularly to a communications apparatus and a method for reducing power consumption of a communications apparatus operating under an access point (AP) mode.

2. Description of the Related Art

With the development of wireless communications technology, mobile electronic devices may be provided with more than one wireless communications service, such as Bluetooth, Wireless Fidelity (Wi-Fi), Worldwide Interoperability for Microwave Access (WiMAX) wireless communications service, and so on. For the Wi-Fi application, the mobile electronic devices may act as a station which can associate with an access point (AP) and further access a network through the AP, or may act as an AP which can provide internet access services for other peer devices associated therewith.

Since more and more wireless communications services are now being provided by mobile electronic devices, how to save battery power to extend battery life is an important issue worth being considered.

BRIEF SUMMARY OF THE INVENTION

Communications apparatuses and methods for reducing power consumption of a communications apparatus in an AP mode are provided. An exemplary embodiment of a communications apparatus comprises an RF signal processing device, a baseband signal processing device and an access control module. The RF signal processing device transmits and receives an RF signal and processes the RF signal in accordance with a predetermined protocol to generate a first signal. The baseband signal processing device is coupled to the RF signal processing device and processes the first signal. The access control module controls operations of the communications apparatus in at least a station mode and an AP mode. The access control module issues a first indication signal and a second indication signal under the AP mode so that the RF signal processing device and the baseband signal processing device are switched between a first power level and a second power level in the AP mode. In the AP mode, the communications apparatus is operative to provide a network access service for one or more peer device(s) associated with the communications apparatus. When the RF signal processing device and the baseband signal processing device are operated in the first power level, the transmission and reception of the RF signals and the processing of the baseband signals are suspended.

An exemplary embodiment of a method for reducing power consumption of a communications apparatus operating in an AP mode comprises: operating a radio frequency (RF) signal processing device and a baseband signal processing device of the communications apparatus in a first power level for a first duration when the communications apparatus operates in the AP mode, wherein in the AP mode, the communications apparatus is operative to provide a network access service for one or more peer device(s) associated with the communications apparatus; and operating the RF signal processing device and the baseband signal processing device in a second power level for a second duration after the end of the first duration when the communications apparatus operates in the AP mode to detect whether a communications channel is busy or not during the second time period.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
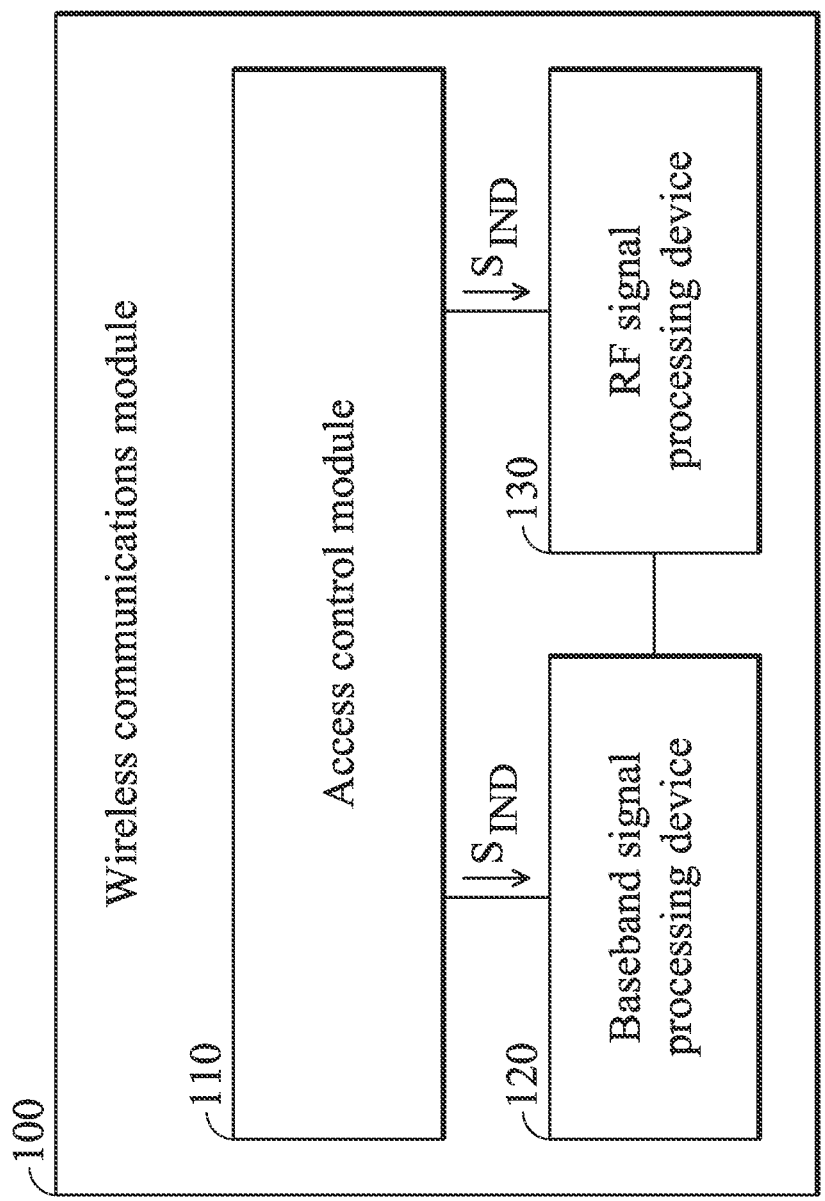
FIG. 1 is a block diagram of a wireless communications module according to an embodiment of the invention.

FIG. 1 is a block diagram of a wireless communications module according to an embodiment of the invention. According to a preferred embodiment of the invention, the wireless communications module 100 may be a Wi-Fi module. As used herein, the term "Wi-Fi" is short for wireless fidelity and is meant to encompass any type of 802.11 network or other wireless networks, whether 802.11b, 802.11a, 802.11g, 802.16, dual-band, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. A user with a "Wi-Fi Certified" product can use any brand of access point with any other brand of client hardware that also is certified. Typically, however, any Wi-Fi product using the same radio frequency (e.g., 2.4 GHz for 802.11b or 802.11g, and 5 GHz for 802.11a) will work with any other, even if such products are not "Wi-Fi Certified". The term "Wi-Fi" is further intended to encompass future versions and/or variations on the foregoing communications standards. Each of the foregoing standards is hereby incorporated by reference.

The wireless communications module 100 may at least comprise an access control module 110, a baseband signal processing device 120 and a radio frequency (RF) signal processing device 130. The RF signal processing device 130 is operative to transmit and receive RF signals to or from air an interface, and process the RF signals in accordance with a predetermined protocol to generate baseband signals (or called first signal). For example, the RF signal processing device 130 may convert the received RF signals to baseband signals which are going to be processed by the baseband signal processing device 120. In a preferred embodiment of the invention, the predetermined protocol may be an 802.11 related protocol as illustrated above. The RF signal processing device 130 may comprise multiple hardware devices to perform RF signal transceiving and processing. For example, the RF signal processing device 130 may comprise a radio transceiver for transceiving the RF signals and a mixer to multiply the baseband signals with a carrier oscillated in a predetermined carrier frequency (for example, 2.4 GHz for a Wi-Fi module). The baseband signal processing device 120 is operative to transmit or receive the baseband signals to or from the RF signal processing device 130 and process the baseband signals. The baseband signal processing device 120 may also comprise multiple hardware devices to perform baseband signal processing, including Analog to Digital Conversion (ADC)/Digital to Analog Conversion (DAC), gain adjusting, modulation/demodulation, encoding/decoding, and so on.

The access control module 110 may be operative to control the operations of the communications apparatus. According to an embodiment of the invention, the access control module 110 may be implemented by one or more software module(s), hardware device(s), or any combination thereof. In a preferred embodiment of the invention, the access control module 110 may be a media access control (MAC) module of the Wi-Fi module and may control the operations of the baseband signal processing device 120, the RF signal processing device 130 and/or some other device(s) (not shown) in the wireless communications module 100 in accordance with the MAC layer protocol. Note that in order to clarify the concept of the invention, FIG. 1 presents a simplified block diagram, in which only the elements relevant to the invention are shown. For example, in some embodiments of the invention, the wireless communications module 100 may further comprise a processing unit (such as a microprocessor) for controlling the whole system operations. Therefore, the invention should not be limited to what is shown on the FIG. 1.

Figure 2:
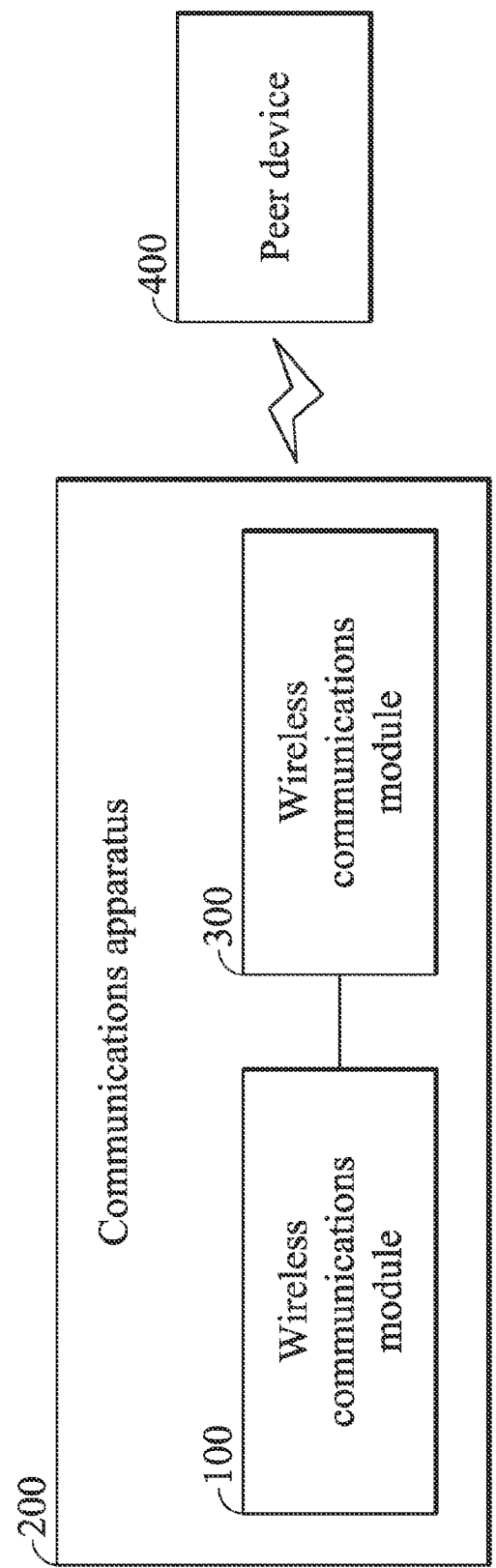
FIG. 2 is a block diagram of a communications apparatus according to an embodiment of the invention.

FIG. 2 is a block diagram of a communications apparatus according to an embodiment of the invention. In a preferred embodiment of the invention, the communications apparatus 200 may comprise more than one wireless communications module, such as the wireless communications modules 100 and 300. For example, the wireless communications module 100 may be the Wi-Fi module and the wireless communications module 300 may be a cellular communication module. In other embodiments of the invention, the communications apparatus 200 may further comprise a Bluetooth module, a Wimax module, or others. Therefore, FIG. 2 only shows an exemplary communications apparatus and the invention should not be limited thereto.

According to an embodiment of the invention, the communications apparatus 200 equipped with a Wi-Fi module (for example, the wireless communications module 100) may operate in at least a station mode and an access point (AP) mode. When operating in the station mode, the communications apparatus 200 may act as a station and associate with a Wi-Fi access point (AP) so that the communications apparatus 200 may connect to a wired network in accordance the 802.11 related protocol via the Wi-Fi AP. The access process of the Wi-Fi module may involve three steps: active/passive scanning, authentication and association, and enabling the Wi-Fi module to associate with an AP. Active scanning is used by the Wi-Fi module to scan surrounding wireless networks and locate a compatible one. In one way of active scanning, the Wi-Fi module prepares a list of channels and broadcasts a probe request (with the SSID null) frame on each of them. The APs that receive the probe request sends a probe response. The Wi-Fi module associates with the AP with the strongest signal. In another way, the Wi-Fi module only unicasts a probe request (with a specified SSID). When an AP receives the probe request, it sends a probe response. This active scanning mode enables the Wi-Fi module to access a specified wireless network. Passive scanning is used by the Wi-Fi module to discover surrounding wireless networks through listening to the beacon frames periodically sent by an AP. The Wi-Fi module prepares a list of channels and listens to beacons on each of these channels. To prevent illegal clients from accessing a wireless network, authentication may be needed between the Wi-Fi module and an access controller (AC) managing all APs in a wireless local area network (WLAN) or between the WLAN and the associated AP. Two types of authentication: open system authentication, and shared key authentication, may be employed.

When the Wi-Fi module chooses a compatible network with a specified SSID and authenticates to an AP, it sends an association request frame to the AP. The AP sends an association response to the Wi-Fi module and adds the client's information in its database. The Wi-Fi module may go into a power saving (PS) mode (also called a sleep mode) for long time periods. Subsequently, the AP may maintain a continually updated record of the Wi-Fi module currently working in the PS mode, and buffer the packets addressed to the Wi-Fi module until the Wi-Fi module specifically requests for the packets by sending a polling request (briefly in PS-Poll) to the AP. As part of a Beacon Frame, the AP may periodically transmit information indicating which Wi-Fi module has packets buffered at the AP. Thus, the Wi-Fi module may periodically wake up to receive the Beacon Frame. If there is an indication that at least one packet has been stored at the AP and is waiting for delivery, the corresponding WLAN module may stay awake and send the PS-Poll to the AP to obtain the buffered packet.

On the other hand, when operating in the AP mode (which is also named as a tethering and portable hotspot function in the Android system), the communications apparatus 200 may act as an AP and operate as the AP described above, and may provide internet access services for other peer device(s) (For example, the peer device 400 as shown in FIG. 2, which may be regarded as the station(s)) associated therewith. According to an embodiment of the invention, the access control module 110 may further control the power levels of the baseband signal processing device 120 and the RF signal processing device 130 via an indication signal $S_{IND}$ when the communications apparatus 200 operates under the AP mode for power saving. For example, the access control module 110 may control the on or off status of the baseband signal processing device 120 and the RF signal processing device 130 via the indication signal $S_{IND}$, or, control the baseband signal processing device 120 and the RF signal processing device 130 at a high power level or a low power level via the indication signal $S_{IND}$. Note that conventionally, an AP will never turn off its hardware device(s) for RF signal transceiving and processing, because once the hardware device(s) is/are turned off, the transmission and reception of the RF signals are suspended and packet loss may occur.

However, according to the embodiments of the invention, the baseband signal processing device 120 and the RF signal processing device 130 may be switched between a first power level and a second power level, e.g. repeatedly turned on and off, when the communications apparatus 200 operates under the AP mode for power saving. For simplicity, in the following embodiments of the invention, both the baseband signal processing device 120 and the RF signal processing device 130 are turned on or off or switch power levels in response to the indication signal $S_{IND}$. Note that in other embodiments of the invention, different ways of controlling the on and off status or the power levels of the baseband signal processing device 120 and the RF signal processing device 130 may be implemented, as long as the baseband signal processing device 120 and the RF signal processing device 130 may be repeatedly turned on and off or switch between different power levels when the communications apparatus 200 operates under the AP mode for power saving.

For example, one of the baseband signal processing device 120 and the RF signal processing device 130 may receive the indication signal $S_{IND}$ from the access control module 110 and relay the indication signal $S_{IND}$ to the other one, or the access control module 110 may issue different indication signals for the baseband signal processing device 120 and the RF signal processing device 130, respectively, so that the baseband signal processing device 120 and the RF signal processing device 130 may be turned on and off or switch between different power levels synchronously or asynchronously, or others. While the invention has been described in terms of a preferred embodiment where the baseband signal processing device 120 and the RF signal processing device 130 both receive the indication signal $S_{IND}$ from the access control module 110, it is to be understood that the invention is not limited thereto. To the contrary, it is intended to cover various modifications and similar arrangements. Therefore, the scope of the appended claims should be accorded the broadest interpretation so as to encompass all such modifications and similar arrangements.

According to the embodiment of the invention, for the duration when being turned on, the baseband signal processing device 120 and the RF signal processing device 130 may be activated and operative to detect channel activity. For example, the baseband signal processing device 120 and the RF signal processing device 130 may detect whether a communications channel is busy (for example, there is some signal or energy transmitted on the communications channel) or not by performing a clear channel assessment (CCA). After the CCA, the baseband signal processing device 120 may further report a detection result to the access control module 110. When the detection result indicates that the communications channel is busy, it means that there may be some packets transmitted by the peer device 400 associated with the communications apparatus 200. Therefore, the access control module 110 may further extend the on duration of the RF signal processing device 130 and the baseband signal processing device 120 for receiving the packet. According to an embodiment of the invention, the access control module 110 may extend the on duration of the RF signal processing device 130 and the baseband signal processing device 120 via the indication signal $S_{IND}$. For example, the indication signal $S_{IND}$ may carry one bit of data, in which '0' (or logic low) may represent an 'off' status and the '1' (or logic high) may represent an 'on' status. The access control module 110 may extend the on duration of the RF signal processing device 130 and the baseband signal processing device 120 by extending the duration of the '1' carried in the indication signal $S_{IND}$. Note that the invention has been described in terms of a preferred embodiment where the indication signal $S_{IND}$ carries one bit of data, however, it is to be understood that the invention is not limited thereto. To the contrary, it is intended to cover various modifications and similar arrangements. Therefore, the scope of the appended claims should be accorded the broadest interpretation so as to encompass all such modifications and similar arrangements.

Figure 3:
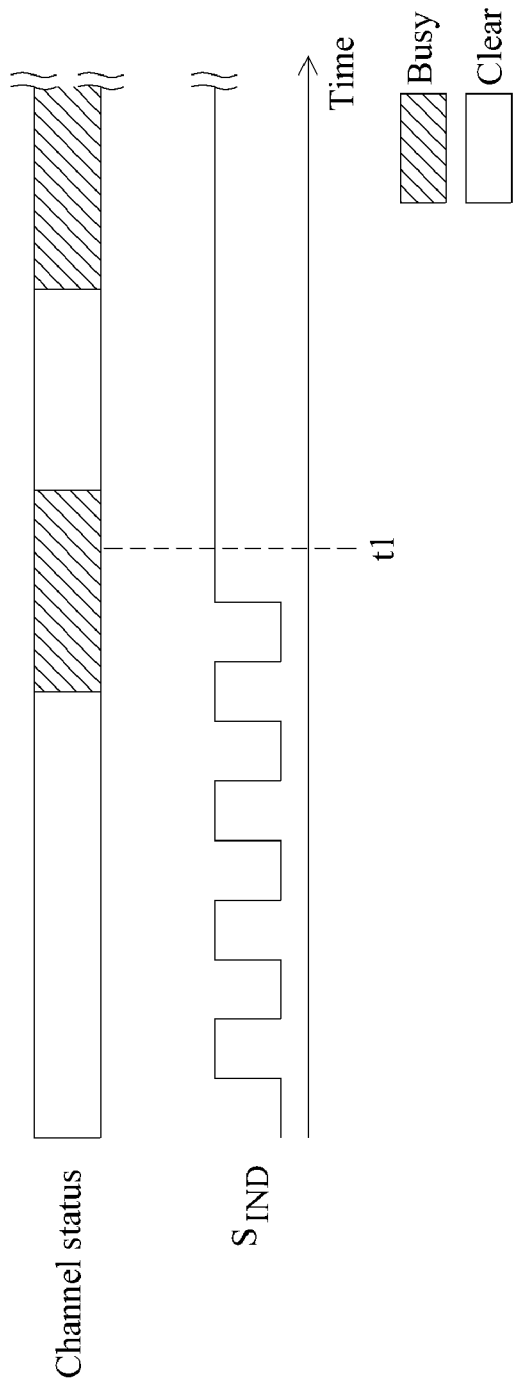
FIG. 3 is a timing diagram showing an exemplary waveform of the indication signal $S_{IND}$ with respect to the communications channel status according to an embodiment of the invention.

FIG. 3 is a timing diagram showing an exemplary waveform of the indication signal $S_{IND}$ with respect to the communications channel status according to an embodiment of the invention. As shown in FIG. 3, the RF signal processing device 130 and the baseband signal processing device 120 may be rapidly and repeatedly turned on and off before the time t1 in response to the indication signal $S_{IND}$. According to a preferred embodiment of the invention, in order to be rapidly turned on and off, a duration of an on-off cycle (or, a switching cycle for switching between the first power level and the second power level) of the RF signal processing device 130 and the baseband signal processing device 120 may be shorter than a duration of transmitting one physical layer convergence procedure (PLCP) protocol data unit (PPDU).

Figure 4:
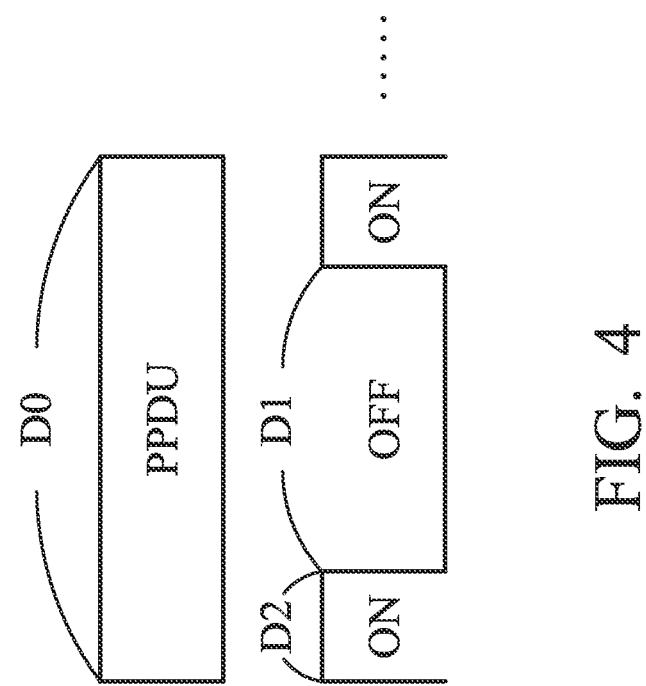
FIG. 4 is a schematic diagram showing a duration required for transmitting one PPDU with respect to an exemplary on-off cycle of the RF signal processing device and the baseband signal processing device according to an embodiment of the invention.

FIG. 4 is a schematic diagram showing a duration required for transmitting one PPDU with respect to an exemplary on-off cycle of the RF signal processing device 130 and the baseband signal processing device 120 according to an embodiment of the invention. As the example shown in FIG. 4, the duration of transmitting one PPDU is labeled as D0, the off duration of the RF signal processing device 130 and the baseband signal processing device 120 is labeled as D1 and the on duration of the RF signal processing device 130 and the baseband signal processing device 120 is labeled as D2. In a preferred embodiment of the invention, a length of D1 plus D2 is preferably shorter than a length of D0. The purpose of limiting the duration of an on-off cycle of the RF signal processing device 130 and the baseband signal processing device 120 to be shorter than a duration of transmitting one PPDU is for the communications apparatus 200 not to miss the chance of detecting the presence of a packet transmitted by the peer device 400 (even if the packet cannot be successfully received by the communications apparatus 200).

Referring back to FIG. 3, suppose that at the time t1, the baseband signal processing device 120 has detected that the communications channel is busy, the baseband signal processing device 120 may further report the detection result to the access control module 110. Based on the detection result indicating that the communications channel is now busy, the access control module 110 may extend an on duration of the RF signal processing device 130 and the baseband signal processing device 120. For example, the access control module 110 may control the RF signal processing device 130 and the baseband signal processing device 120 to be turned on for a duration which is longer than previous (i.e. when the channel is detected as clear) via the indication signal $S_{IND}$, as shown in FIG. 3.

According to an embodiment of the invention, in order to further make sure that the communications apparatus 200 will not miss the chance of detecting the presence of a packet transmitted by the peer device 400, the communications apparatus 200 may further set a protection bit in a beacon frame and periodically transmit the beacon frame via the RF signal processing device 130 so as to trigger the peer device 400 to enter a protection mode. Under the protection mode, the peer device 400 may transmit low rate data before transmitting the high rate data. For example, the peer device 400 may transmit the Direct-Sequence Spread Spectrum (DSSS) modulated ready to send (RTS) or clear to send to self (CTS2SELF) packet data at 1 or 2 Mbit/s data rate before transmitting the Orthogonal Frequency-Division Multiplexing (OFDM) or other scheme modulated payload data at a higher data rate (such as 54 Mbit/s). Because low rate data is sent before the payload data and the duration of the on-off cycle of the RF signal processing device 130 and the baseband signal processing device 120 is well-controlled by the access control module 110, the communications apparatus 200 can always be aware of the presence of a packet transmitted by the peer device 400 during the on time (for example, the duration D2 shown in FIG. 4) of the RF signal processing device 130 and the baseband signal processing device 120. In this manner, the communications apparatus 200 may not suffer from too short PPDU of high rate payload data. Note that to improve the overall throughput, it is preferable that only the peer device enters the protection mode (that is, the communications apparatus 200 does not have to enter the protection mode to prevent the overall throughput from being further downgraded).

As previously described, turning off the RF signal processing device 130 under the AP mode may cause unsuccessful reception of the packet for one time. However, because the RF signal processing device 130 and baseband signal processing device 120 will be turned on for a long time right after the channel busy status or the presence of a packet transmitted by the peer device 400 is detected (such as the time t1 shown in FIG. 3), the packet can still be successfully received by the communications apparatus 200 when the peer device 400 retransmits it according to the 802.11 related retry mechanism. Since the packet can be successfully received during the first retry, the peer device 400 does not further decrease the data rate and the overall throughput is not further downgraded.

Figure 5:
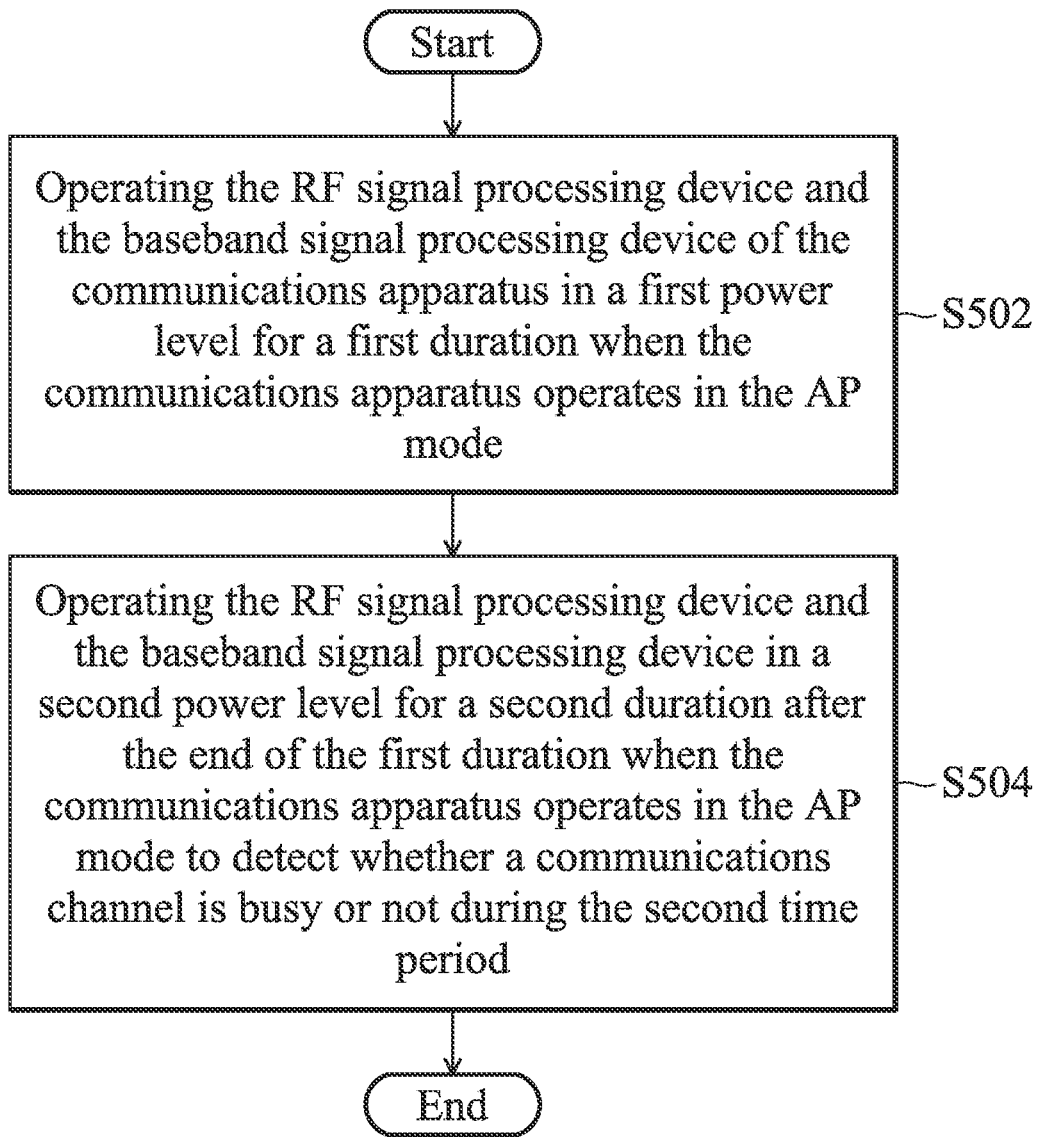
FIG. 5 is a flow chart of a method for reducing power consumption of a communications apparatus in an AP mode.

FIG. 5 is a flow chart of a method for reducing power consumption of a communications apparatus in an AP mode. First of all, the RF signal processing device and the baseband signal processing device of the communications apparatus are operated in a first power level, such as being turned off, for a first duration when the communications apparatus operates in the AP mode (Step S502). Next, the RF signal processing device and the baseband signal processing device are operated in a second power level, such as being turned on, for a second duration after the end of the first duration to detect whether a communications channel is busy or not (Step S504). In a preferred embodiment of the invention, the step S502 of operating the RF signal processing device and the baseband signal processing device in the first power level and the step S504 of operating the RF signal processing device and the baseband signal processing device in the second power level may be performed repeatedly and rapidly so as to save the battery power of the communications apparatus when there is no transmission (TX) or reception (RX) traffic (that is, in the standby state) in the AP mode. For example, when a user of a peer device associated with the communications apparatus is browsing the website, checking emails, or others. In some embodiments of the invention, the amount of reduced power consumption depends on the CCA detection speed. For example, when the time required for performing CCA detection is about 10 μs, the access control module 110 may control the RF signal processing device 130 and the baseband signal processing device 120 to be turned on for 10 μs, and then turned off for 80 μs. In this manner, about 80% (that is, 80/(80+10*2)=80%) of the power can be saved when the communications apparatus is in the standby state in the AP mode.

Note that based on the invention concept, once there is any packet transmission or reception activity to be performed, the mechanism of repeatedly turning on and off or switching between different power levels of the RF signal processing device 130 and the baseband signal processing device 120 may be halted (that is, the RF signal processing device 130 and the baseband signal processing device 120 may be kept turned on or switch to the second power level) until the transmission or reception activity is completed. Note further that when the mechanism of repeatedly turning on and off or switching between different power levels of the RF signal processing device 130 and the baseband signal processing device 120 is halted, the communications apparatus may further trigger the peer device to leave the protection mode (if the peer device has entered the protection mode) to increase the data throughput. In addition, when there is no transmission or reception activity to be performed in a predetermined time period, the mechanism of repeatedly turning on and off or switching between different power levels of the RF signal processing device 130 and the baseband signal processing device 120 may be resumed again to save the battery power.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:
1. A communications apparatus, comprising:
a radio frequency (RF) signal processing device, for transmitting and receiving an RF signal and processing the RF signal in accordance with a predetermined protocol to generate a first signal;
a baseband signal processing device, coupled to the RF signal processing device, for processing the first signal; and
an access control module, for controlling operations of the communications apparatus in at least a station mode and an access point (AP) mode,
wherein in the AP mode, the communications apparatus is operative to provide a network access service for one or more peer device(s) associated therewith, and
wherein the access control module issues a first indication signal and a second indication signal under the AP mode so that the RF signal processing device and/or the baseband signal processing device are switched between a first power level and a second power level in the AP mode;
wherein a duration of an switching cycle from the first power level to the second power level of the RF signal processing device and the baseband signal processing device is shorter than a duration of transmitting one physical layer convergence procedure (PLCP) protocol data unit (PPDU).

2. The communications apparatus as claimed in claim 1, wherein the baseband signal processing device further detects whether a communications channel is busy or not and reports a detection result to the access control module when being switched to the second power level.

3. The communications apparatus as claimed in claim 2, wherein when the detection result indicates that the communications channel is busy, the access control module further extends duration of switching to the second power level for the RF signal processing device and the baseband signal processing device via the first and second indication signals.

4. The communications apparatus as claimed in claim 1, wherein the access control module further sets a protection bit in a beacon frame and periodically transmits the beacon frame via the RF signal processing device so as to trigger the peer device(s) to enter a protection mode.

5. The communications apparatus as claimed in claim 1, wherein the predetermined protocol is an 802.11 related protocol.

6. The communications apparatus as claimed in claim 1, wherein in the first power level, the RF signal processing device and the baseband signal processing device are turned off, and the transmission and reception of the RF signal and the processing of the RF signal and the first signal are suspended.

7. A method for reducing power consumption of a communications apparatus operating in an access point (AP) mode, comprising:
operating a radio frequency (RF) signal processing device and/or a baseband signal processing device of the communications apparatus in a first power level for a first duration when the communications apparatus operates in the AP mode, wherein in the AP mode, the communications apparatus is operative to provide a network access service for one or more peer device(s) associated with the communications apparatus; and
operating the RF signal processing device and/or the baseband signal processing device in a second power level for a second duration after the end of the first duration when the communications apparatus operates in the AP mode to detect whether a communications channel is busy or not during the second time period;
wherein a length of the first duration plus the second duration is shorter than a length of a duration of transmitting one physical layer convergence procedure (PLCP) protocol data unit (PPDU).

8. The method as claimed in claim 7, wherein the steps of operating the RF signal processing device and the baseband signal processing device in the first power level and operating the RF signal processing device and the baseband signal processing device in the second power level are performed repeatedly when there is no transmission or reception traffic for the communications apparatus in the AP mode.

9. The method as claimed in claim 7, further comprising:
operating the RF signal processing device and the baseband signal processing device in the second power level for a third duration longer than the second duration so as to extend an on duration of the RF signal processing device and the baseband signal processing device when a detection result indicates that the communications channel is busy.

10. The method as claimed in claim 7, further comprising:
periodically transmitting a beacon frame by the communications apparatus, wherein a protection bit in the beacon frame is set by the communications apparatus so as to trigger the peer device(s) to enter a protection mode.

11. The method as claimed in claim 10, further comprising:
transmitting a ready to send (RTS) or clear to send to self (CTS2SELF) data packet at a lower data rate by the peer device(s) entering the protection mode; and
transmitting payload data after the RTS or CTS2SELF data packet at a higher data rate by the peer device(s).

12. The method as claimed in claim 10, wherein in the first power level, the RF signal processing device and the baseband signal processing device are turned off, and transmission and reception of RF signal and processing of baseband signal are suspended.

* * * * *